United States Patent [19]
Corby et al.

[11] Patent Number: 5,360,133
[45] Date of Patent: Nov. 1, 1994

[54] BULK MATERIAL CONTAINER WITH A SUPPORT STAND THEREFOR

[75] Inventors: Kenneth D. Corby, Rochester; Andrew W. Elder, Craryville, both of N.Y.

[73] Assignee: Eastman Kodak Company, Rochester, N.Y.

[21] Appl. No.: 181,927

[22] Filed: Jan. 14, 1994

[51] Int. Cl.$^5$ .............................................. B65D 90/14
[52] U.S. Cl. ................................... 220/630; 220/635; 220/647; 220/636; 248/188.2; 215/1 C
[58] Field of Search ........................... 248/188.2, 148; 220/608, 628, 629, 630, 631, 633, 635, 636, 729, 646, 647; 215/1 C

[56] References Cited

U.S. PATENT DOCUMENTS

| | | | |
|---|---|---|---|
| 3,278,666 | 10/1966 | Donald | 264/98 |
| 3,369,690 | 2/1968 | Hayes | 215/100 |
| 3,480,168 | 11/1969 | Lee | 215/1 |
| 3,499,071 | 3/1970 | Hurst | 264/94 |
| 3,752,494 | 8/1973 | Dunn | 220/628 |
| 4,272,233 | 6/1981 | Cochran | 425/526 |
| 4,928,860 | 5/1990 | Knight | 220/631 |
| 4,990,964 | 2/1991 | Kraehn | 355/260 |
| 5,123,554 | 6/1992 | Arridson et al. | 215/1 C |
| 5,165,558 | 11/1992 | Cargile | 215/100 R |
| 5,186,898 | 2/1993 | Bridgham et al. | 220/628 |

*Primary Examiner*—S. Castellano
*Attorney, Agent, or Firm*—Lawrence P. Kessler

[57] ABSTRACT

A container for bulk material and the like, and the method of manufacture therefor. The container comprises a bottom wall with side walls extending upwardly from the bottom wall and oriented such that when the side walls are substantially vertical, the bottom wall is at an angle to the horizontal. An upper wall is connected to the side walls, the upper wall having an opening defined therethrough to enable the container to be filled or emptied. A support for holding the container in a substantially upright position is provided. The support includes a first foot integrally formed with the bottom wall and extending therefrom to lie in a plane perpendicular to the plane of the bottom wall, and a second foot removably attached to the first foot in a first configuration, and detachably engagable with the first foot in a second configuration different from the first configuration to lie in a plane perpendicular to the first foot.

6 Claims, 4 Drawing Sheets

BULK MATERIAL CONTAINER WITH A SUPPORT STAND THEREFOR

BACKGROUND OF THE INVENTION

1. Technical Field

The present invention relates in general to containers for bulk material or the like, and more particularly to a bulk material container with a support stand therefor and the manufacture of such container and support stand.

2. Background Art

Many industrial and commercial products, supplied in bulk form, are stored in containers made of thermoplastics for example. Such containers may be used for holding liquids, such as detergents or pesticides, or solid material, such as powdered detergents or food mixes. These containers have also been adapted to store particulate matter such as marking particles for electrostatographic reproduction apparatus.

It is common practice in the handling of such containers that the container be shipped or stored in an upright condition. This is necessary to prevent spillage or undue agglomeration of the bulk material. When the container has other than a completely flat bottom, upright orientation of the container requires some sort of support stand for the container. One type of support stand includes a wireform member designed to engage the container and form a substantially flat base therefor. However, such wireform support stands have been found to damage containers by poking holes in the sides thereof.

Another type of support stand for bulk material containers is described, for example, in U.S. Pat. No. 3,480,168, issued Nov. 25, 1969, in the name of Lee. Such stand includes support feet created with the container when the container is formed. When the container is formed in a mold by conventional extrusion blow molding techniques, two of the support feet may be formed at the parting line from the normal flash. The remaining two support feet, respectively spaced 90° from the first mentioned feet, are formed by using a split section in the base of the mold at 90° to the parting line. As such the mold is of a rather complicated construction, whereby the resulting footed container becomes expensive to produce. Further, because the feet of the support stand intersect at a point substantially directly beneath the center of gravity of the container, the container is only marginally stable in its upright orientation.

SUMMARY OF THE INVENTION

In view of the foregoing discussion, this invention is directed to a container for bulk material or the like with a support stand for such container, and the method of manufacture of such container. The bulk material container comprises a bottom wall with side walls extending upwardly from the bottom wall and oriented such that when the side walls are substantially vertical, the bottom wall is at an angle to the horizontal. An upper wall is connected to the side walls, the upper wall having an opening defined therethrough to enable the container to be filled or emptied. A support for holding the container in a substantially upright position is provided. The support includes a first foot integrally formed with the bottom wall and extending therefrom to lie in a plane perpendicular to the plane of the bottom wall, and a second foot removably attached to the first foot in a first configuration, and detachably engagable with the first foot in a second configuration different from the first configuration to lie in a plane perpendicular to the first foot.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

DETAILED DESCRIPTION OF THE INVENTION

Figure 1:
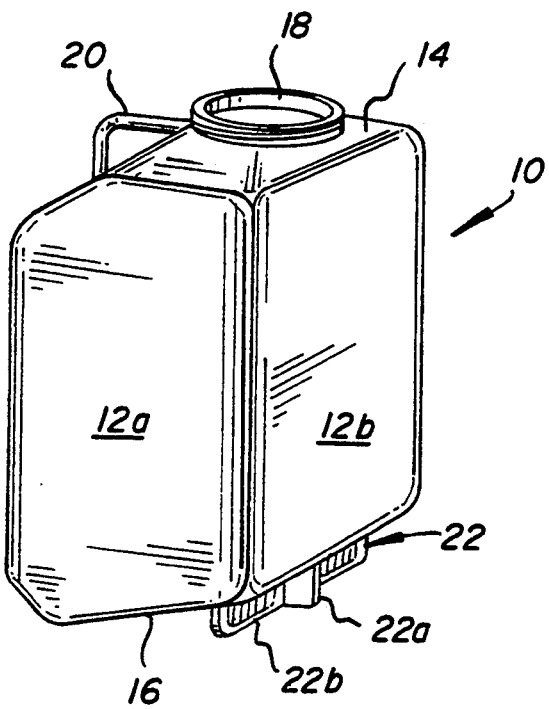
FIG. 1 is a view, in perspective, of a bulk material container with support stand according to this invention.
Figure 2:
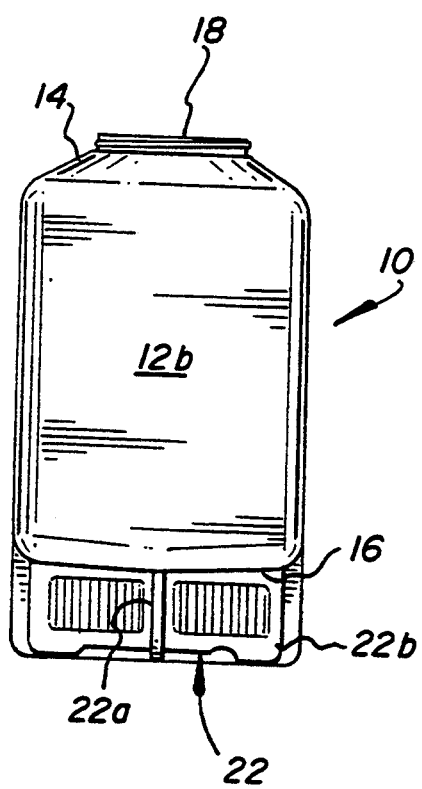
FIG. 2 is a front elevational view of the container of FIG. 1.
Figure 3:
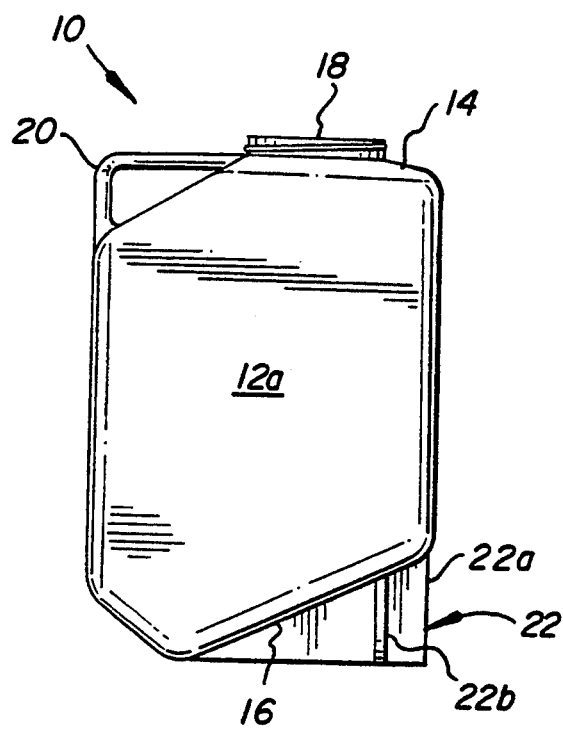
FIG. 3 is a side elevational view of the container of FIG. 1.
Figure 6:
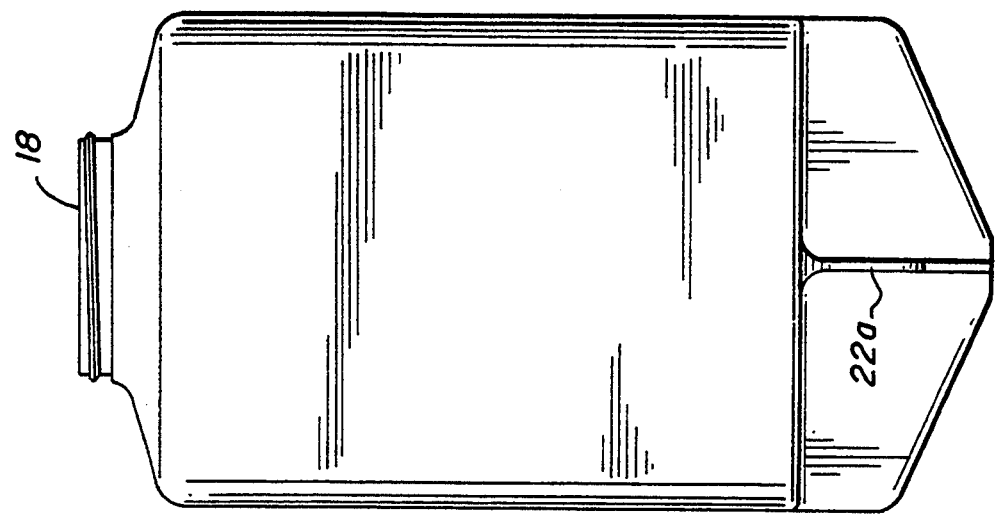
FIG. 6 is a front elevational view of the container as it emerges from the mold with the support stand formed in the flash according to this invention.

Referring now to the accompanying drawings, FIGS. 1–3 show a container for bulk material or the like, such container being designated generally by the numeral 10. The bulk material container 10 includes a vessel having upstanding side walls 12a–12d, a top wall 14, and a bottom wall 16. The side walls 12a and 12c are respectively substantially perpendicular to the side walls 12b and 12d. The top wall 14 has an opening 18 provided therethrough so as to enable bulk material to be loaded into the container vessel, or subsequently emptied therefrom. The opening 18 is defined, for example, by a threaded collar 18a adapted to receive a complementary threaded cap 18b to enable the container 10 to be closed in a manner to prevent the premature escape of bulk material from the container vessel. Further, a handle 20 is connected to the top wall 14. The bottom wall 16 is oriented to lie in a plane which intersects side walls 12a and 12c at an angle to the horizontal when the side walls are generally vertically disposed. Such angle is selected so as to position the bottom wall 16 such that when the container 10 is in its substantially upright orientation, agglomeration of bulk material loaded into the container is substantially prevented.

Since the bottom wall 16 of the container 10 is at an angle to the side walls 12a and 12c, in order for the container to be able to stand upright by itself, the container is provided with a stabilizing support stand 22. The ability of the container 10 to stand substantially upright is necessary for efficient storage of the container, and packing and transport of a plurality of containers. The support stand 22 includes a first foot 22a extending from the bottom wall 16 and lying in a plane perpendicular to the plane of the bottom wall, and a second foot 22b engagable with the first foot. The second foot 22b lies in a plane perpendicular to the plane of the first foot 22a, and to one side of a plane perpendicular to the first foot passing through the center of gravity of the container 10.

Figure 4:
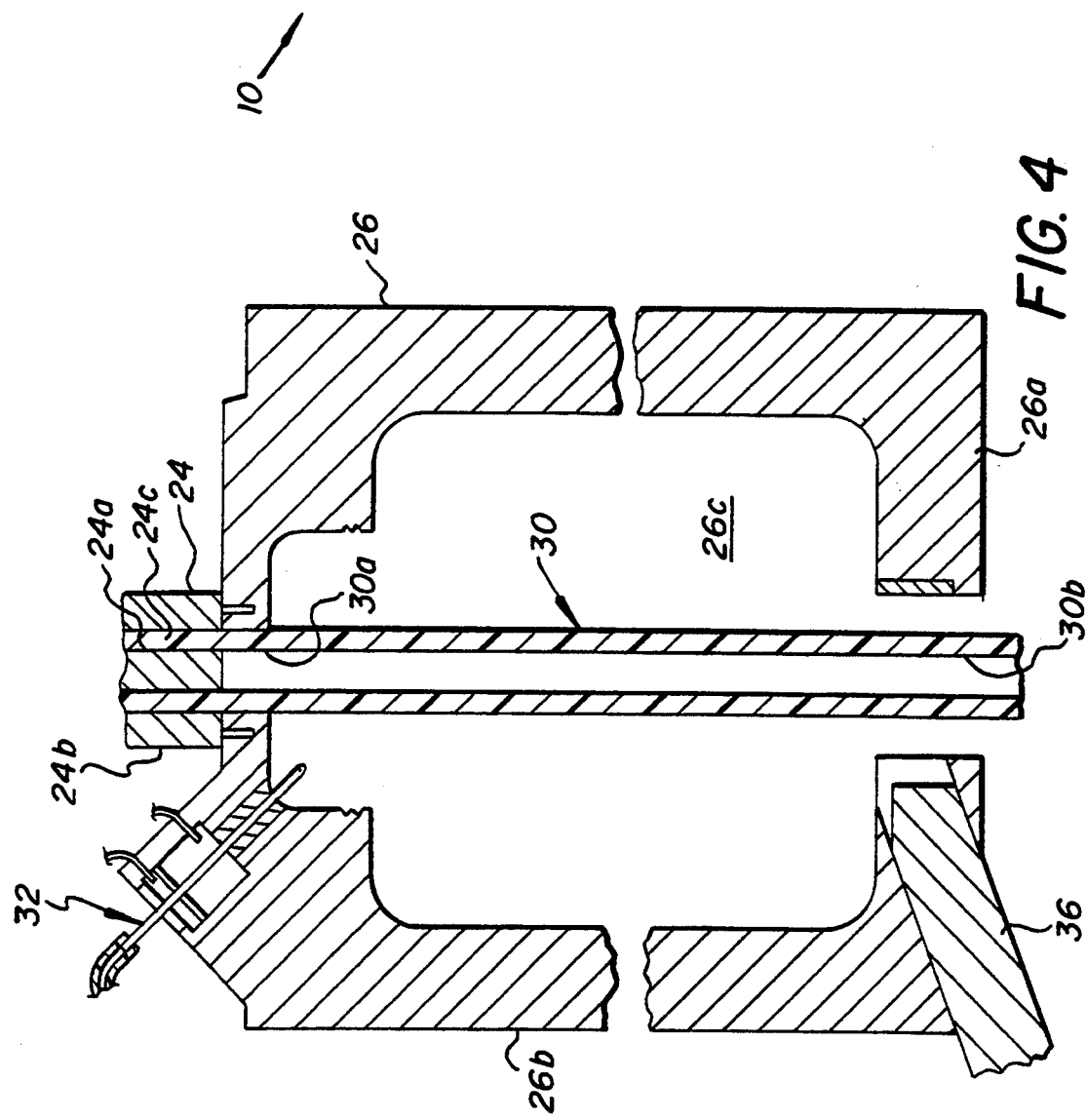
FIG. 4 is a front elevational view, in cross-section, of the mold for the container and support stand according to this invention.

The bulk material container 10 is made, for example, of a thermoplastic material such as high density polyethylene. The process by which the container is produced is generally referred to in the art as extrusion blow molding. As shown in FIG. 4, an extrusion head 24 is located adjacent to a mold 26. The extrusion head 24 includes a core 24a and a die 24b, which cooperate to form a passage 24c therebetween. Thermoplastic material is discharged (extruded) from the passage 24c, between the core 24a and the die 24b, to form a hollow parison 30 extending through the mold 26.

The mold 26, in which the container 10 is to be formed, includes a pair of mold halves 26a and 26b which are substantially mirror images of one another. Upon being joined by any well known mold support and actuation apparatus, the mold halves 26a and 26b define a vessel-forming cavity 26c having a top wall, a bottom wall, and side walls extending upwardly from the bottom wall to the top wall. When the side walls are oriented so as to be substantially vertical, the bottom wall is at an angle to the horizontal. Further, the top wall of the vessel-forming cavity 26c defines a threaded collar with an enclosing dome thereover. Upon finishing of the molded bulk container, the dome is removed to provide an opening through the threaded collar in the top wall to enable the finished container to be filled or emptied. The mold halves 26a and 26b also define a handle-forming cavity (not shown) in association with the portion of the vessel-forming cavity 26c defining the top wall.

While the mold halves 26a and 26b are being closed, the upper end 30a and the lower end 30b of the parison 30 are pinched off and sealed. The mold halves are relieved adjacent to the pinch areas for the purpose of forming a desired, particularly configured, flash as will be further explained hereinbelow. During the pinching action, an upper portion of the parison is compressed causing the thermoplastic material thereof to flow into the handle-forming cavity. Once the pinching and sealing have been completed, the blow molding of the container is ready to be accomplished. To effect blow molding, a pressurizing mechanism 32 is associated the mold 26 for the purpose of inflating the parison 30.

The blow molding pressurizing mechanism 32 includes, for example, a blow pipe or needle 32a coupled to a pressurized air source (not shown). The needle 32a has a device, such as a piston arrangement 32b, for reciprocating the needle for selective insertion into the parison 30 just below the pinched off upper end 30a thereof. After the mold halves are completely closed together and the needle 32a is inserted into the parison 30, pressurized fluid, such as high pressure air for example, is supplied by the pressurizing mechanism 32 to cause the parison to expand against the walls of the vessel-forming cavity 26c and form the desired bulk material container as the expanded parison cools.

Once the parison 30 is fully formed in the mold 26, a mechanism 36, such as an extensible ram for example, is actuated to close the lower portion of the parison just above the pinched lower end 30b. Thereafter, the mold halves 26a and 26b are opened, and the formed container can then readily be removed. During the closing action accomplished by the mechanism 36, extra material is left attached to the container in the relieved portion just above the lower pinch area, such material commonly being referred to as "flash". For the most part, the flash is removed in any well known manner, such as by mechanically trimming or grinding down the unwanted flash. However, according to this invention, the flash from the portion of the vessel-forming cavity 26c defining the bottom wall is utilized to form the support stand 22 for the finished container 10. Thus, the lower relieved portion of the mold 26 is particularly configured in the manner described below so that the flash extends from the bottom wall for a distance sufficient to assure that the support stand 22 may be formed therefrom.

Figure 5:
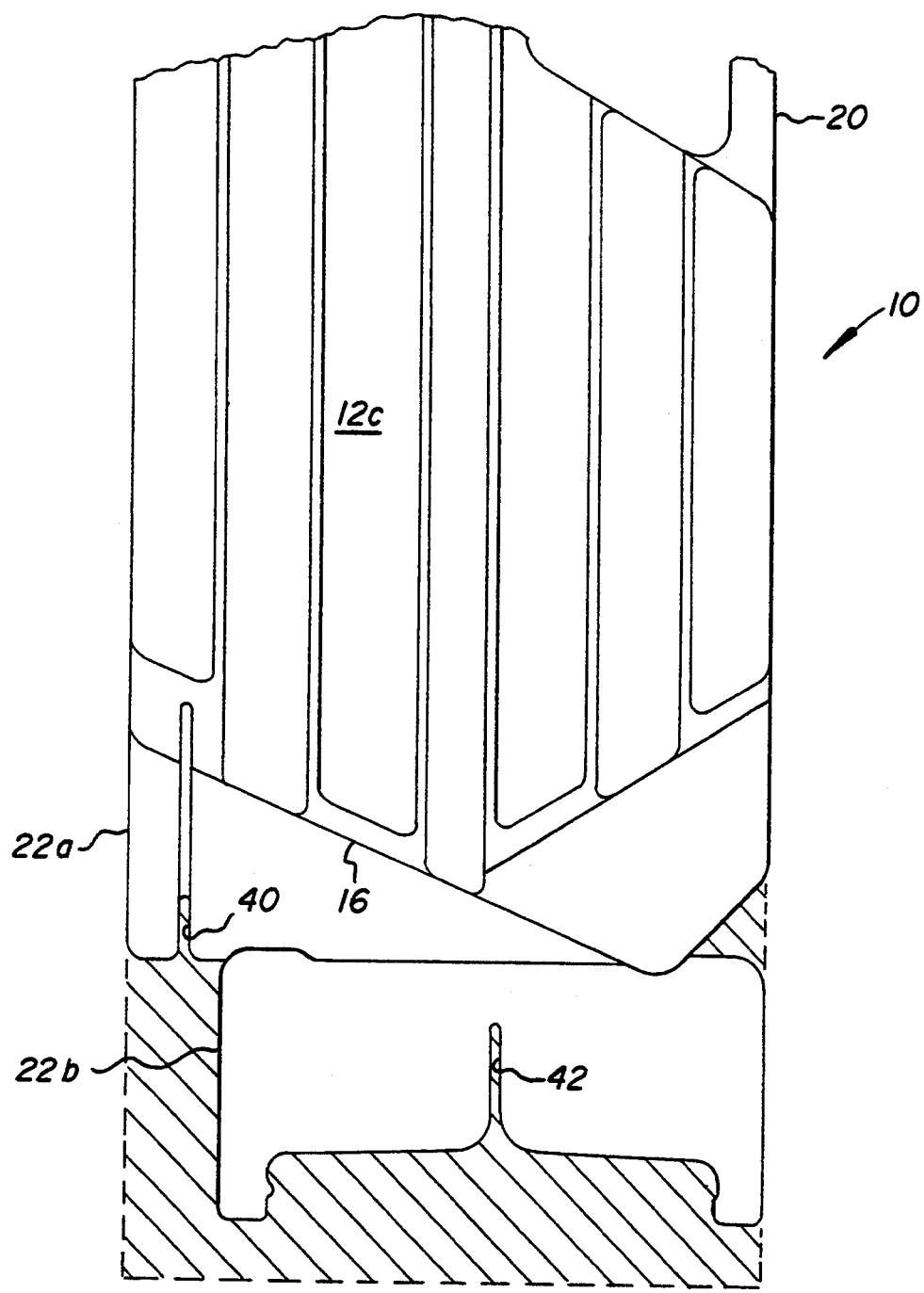
FIG. 5 is a side elevational view of the container as it emerges from the mold with the support stand formed in the flash according to this invention.

The support stand 22, which includes the first foot 22a and the second foot 22b, is formed from the flash in a first configuration (see FIG. 5). A portion of the flash which describes the second foot is detached from the flash and the remainder thereof integrally formed with the bottom wall is shaped to describe the first foot. The first foot 22a is formed to have a slot 40 located to one side of a plane perpendicular to the first foot passing through the center of gravity of the container 10. The second foot 22b is formed to have a complementary slot 42 located at substantially the mid-point of the second foot.

Figure 7:
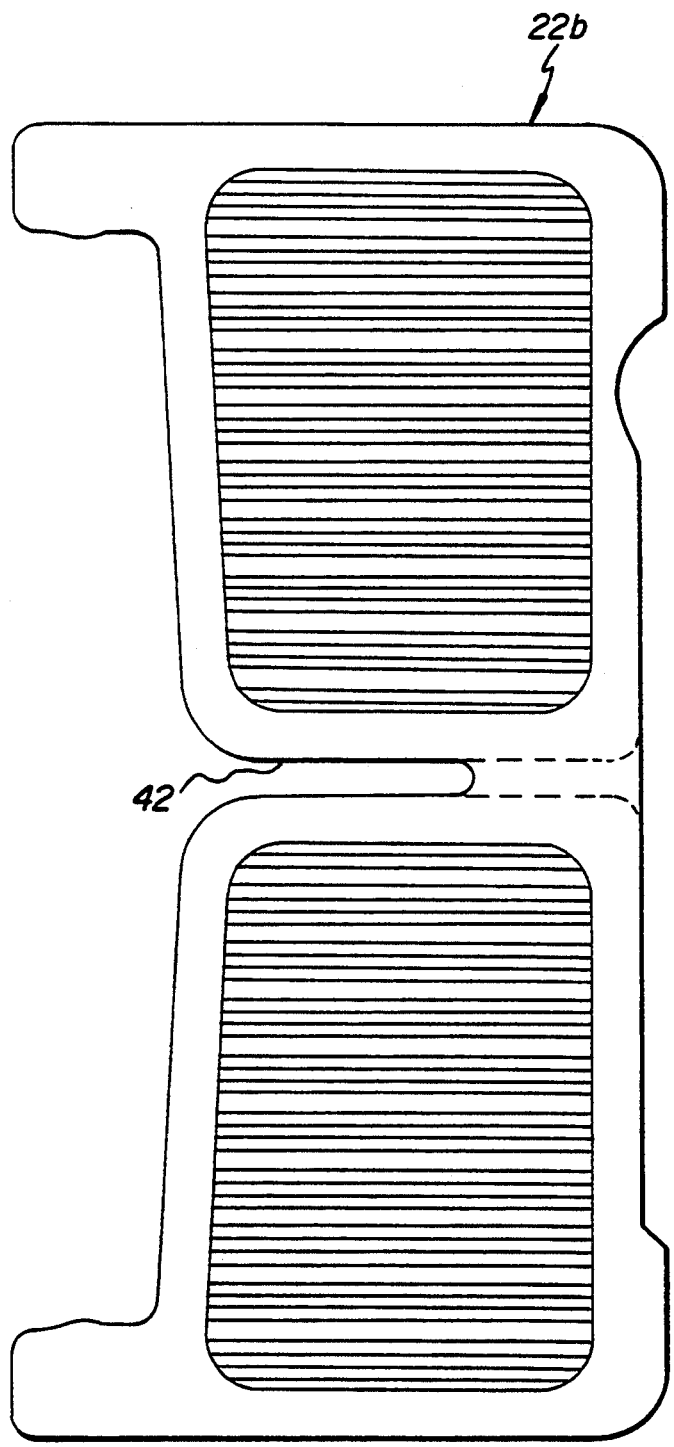
FIG. 7 is front elevational view, on an enlarged scale, of the portion of the support stand formed in the flash according to this invention.
Figure 8:
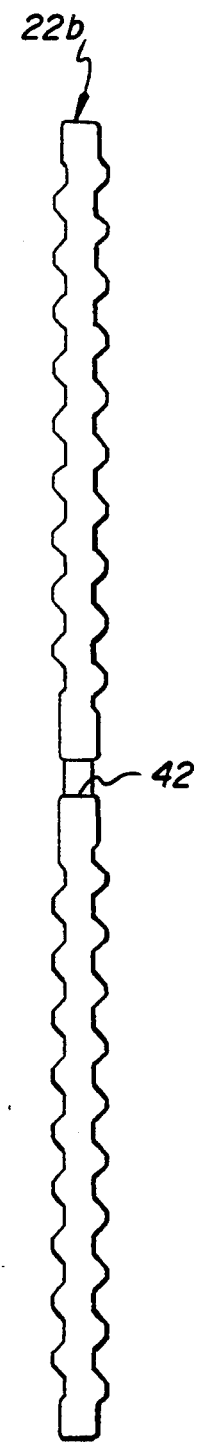
FIG. 8 is top plan view, on an enlarged scale, of the portion of the support stand of FIG. 7.

An exemplary construction for the second foot 22b is shown in FIGS. 7 and 8. The lower relieved portion of the mold 26 may be arranged to have integral ribs for the purpose of forming complementary ribs in the flash. Therefore, as can readily be seen in FIGS. 7 and 8, such second foot is of a rigid (ribbed) construction to provide on assembly with the first foot 22a, a stable stand for the container 10. On assembly, the second foot 22b is engaged with the first foot 22a by mating the respective slots 40 and 42 to provide a second configuration. As such, the second foot lies in a plane perpendicular to the first foot, and is located to one side of a plane perpendicular to the first foot passing through the center of gravity of the container 10. This simple construction provides a structurally stable base for the container 10 when the container is stored or packed with other containers for transportation.

The invention has been described in detail with particular reference to a preferred embodiment thereof, but it will be understood that variations and modifications can be effected within the spirit and scope of the invention as set forth in the claims.

What is claimed is:

1. A container for bulk material, said container comprising:
a bottom wall; side walls extending upwardly from said bottom wall and oriented such that when said side walls are substantially vertical, said bottom wall is at an angle to the horizontal; an upper wall connected to said side walls, means for enabling said container to be filled or emptied; and means for supporting said container in a substantially upright position, said support means including a first foot integrally formed with said bottom wall and extending therefrom to lie in a plane perpendicular to the plane of said bottom wall, and a second foot removably attached to said first foot in a first configuration, and detachably engagable with said first foot in a second configuration different from said first configuration to lie in a plane perpendicular to said first foot.

2. The bulk material container of claim 1 wherein said second foot is engagable with said first foot in said second configuration to lie in a plane located to one side of a plane perpendicular to said first foot passing through the center of gravity of said container.

3. The bulk material container of claim 2 wherein said first and said second feet of said support means respectively define mating slots which enable said second foot to be engagable with said first foot in said second configuration.

4. The bulk material container of claim 2 wherein said first and said second feet of said support means respectively define a plurality of strengthening ribs in said second configuration.

5. The bulk material container of claim 2 wherein said means for enabling said container to be filled or emptied includes an opening defined through said upper wall.

6. The bulk material container of claim 2 further including a handle in association with said upper wall.

* * * * *

UNITED STATES PATENT AND TRADEMARK OFFICE
CERTIFICATE OF CORRECTION

PATENT NO. : 5,360,133
DATED : November 1, 1994
INVENTOR(S) : Kenneth D. Corby, Andrew W. Elder It is certified that error appears in the above-indentified patent and that said Letters Patent is hereby corrected as shown below:

Column 4, line 55, delete "wails" and substitute --walls --.

Signed and Sealed this

Tenth Day of January, 1995

Attest:

BRUCE LEHMAN

Attesting Officer

Commissioner of Patents and Trademarks